United States Patent [19]
Pfarr et al.

[11] Patent Number: 5,868,056
[45] Date of Patent: Feb. 9, 1999

[54] BI-DIRECTIONAL ACTUATOR FOR WORKING TOOL

[75] Inventors: Craig E. Pfarr, Issaquah; Michael J. Wierman, Redmond, both of Wash.

[73] Assignee: Design Systems, Inc., Redmond, Wash.

[21] Appl. No.: 786,398

[22] Filed: Jan. 17, 1997

[51] Int. Cl.[6] .............................. B26D 5/08; B26F 3/00
[52] U.S. Cl. ............................. 83/578; 83/177; 83/428; 83/646
[58] Field of Search .................. 83/177, 428, 53, 83/578, 646

[56] References Cited

U.S. PATENT DOCUMENTS

| | | | |
|---|---|---|---|
| 3,927,591 | 12/1975 | Gerber | 83/177 |
| 4,140,038 | 2/1979 | Higgins . | |
| 4,204,448 | 5/1980 | Pearl . | |
| 4,329,896 | 5/1982 | Singer | 83/578 |
| 4,573,382 | 3/1986 | Kloehn et al. | 83/177 |
| 4,620,466 | 11/1986 | Jumel et al. . | |
| 4,728,379 | 3/1988 | Audi et al. . | |
| 4,738,174 | 4/1988 | Bloomquist . | |
| 4,787,178 | 11/1988 | Morgan et al. | 83/53 |
| 4,790,222 | 12/1988 | Morgan | 83/646 |
| 4,876,934 | 10/1989 | Fagan et al. | 83/177 |
| 4,882,961 | 11/1989 | Zabinski et al. . | |
| 4,916,992 | 4/1990 | Naus . | |
| 5,018,418 | 5/1991 | Nasu . | |
| 5,168,786 | 12/1992 | Huggins et al. | 83/578 |
| 5,184,533 | 2/1993 | Golicz . | |
| 5,243,886 | 9/1993 | Rudy et al. . | |
| 5,357,819 | 10/1994 | Takei . | |
| 5,365,816 | 11/1994 | Rudy . | |
| 5,402,691 | 4/1995 | Dworkowski et al. . | |
| 5,496,431 | 3/1996 | Hirakawa et al. . | |
| 5,533,858 | 7/1996 | Costa . | |

FOREIGN PATENT DOCUMENTS

| | | | |
|---|---|---|---|
| 3631116 | 2/1988 | Germany | 83/177 |
| 2232199 | 9/1990 | Japan | 83/177 |
| 3178800 | 8/1991 | Japan | 83/177 |

Primary Examiner—Rinaldi I. Rada
Assistant Examiner—Sean A. Pryor
Attorney, Agent, or Firm—Christensen O'Connor Johnson & Kindness PLLC

[57] ABSTRACT

An actuator apparatus (10) includes a transverse support structure (14) for guiding a transverse carriage (16) therealong, with the carriage being powered by a remotely located rotational actuator (20) through an endless belt (80) secured to the carriage (16). A second carriage (26) moves along a longitudinal support structure (24) cantilevered transversely from carriage (16). The second carriage is powered by a remotely located second rotational actuator (28) acting through a second endless belt (150). A working tool (30) is mounted on the second carriage (26) for high speed bi-directional movement.

24 Claims, 8 Drawing Sheets

BI-DIRECTIONAL ACTUATOR FOR WORKING TOOL

FIELD OF THE INVENTION

The present invention relates generally to an apparatus for rapidly moving a work tool bi-directionally relative to a workpiece, and more particularly to an apparatus for moving a cutting tool transversely and longitudinally relative to a moving conveyor which supports the workpiece as it is being operated on by the tool.

BACKGROUND OF THE INVENTION

Various work tools have been used to carry out operations on workpieces that travel along conveyors. Commonly the work tool may be supported for movement relative to the workpiece, transversely and/or longitudinally relative to the direction of movement of the conveyor. U.S. Pat. Nos. 5,243,886 and 5,365,816 disclose nozzles that emit very high-speed water jets to cut foods and other objects that are carried by an underlying conveyor belt. The nozzles are mounted on carriages that ride along tracks disposed transversely to the moving conveyor. By timing the transverse movement of the carriages, it is possible to make cuts in the workpiece that are diagonal to the direction of movement of the conveyor and also it is possible to make curved cuts in the workpiece.

However, it is desirable to be able to move the nozzle in the direction longitudinally of the conveyor so as to achieve higher cutting speeds and/or more complicated cutting patterns while maintaining high precision. To date, this effort has been hampered by the inability to move and change the direction of movement of the nozzle as quickly as desirable, due at least in part to the relatively high mass of the carriage and related apparatus employed to mount and move the working tool. For instance, U.S. Pat. Nos. 4,204,448 and 4,882,961 disclose gantry systems for water jet cutters employing a support structure that spans transversely across an underlying conveyor. The transverse support structure rides on longitudinal tracks extending along the sides of the conveyor. A work tool-supporting carriage is carried and guided by the transverse structure. The transverse structure also carries a drive system for moving the carriage along the support structure, back and forth across the path of the conveyor. These structures for carrying and moving the water jet nozzle comprise considerable mass that limits the speed at which the water jet cutter nozzles may be moved, particularly in the direction parallel to the direction of movement of the conveyor.

U.S. Pat. No. 5,402,691 discloses a gantry apparatus similar to that disclosed in U.S. Pat. Nos. 4,204,448 and 4,882,961, but not adapted to be used with workpieces that move on an underlying conveyor. The '691 patent utilizes a typical "H" support structure having a pair of spaced apart, parallel members that span across the workpiece. A longitudinally disposed "Y" support member extends transversely to the parallel members of the "H" support structure. A tool mounting structure moves along the length of the "Y" member under the operation of a drive system, including a drive motor, carried by the Y member, thus adding significantly to the total mass that must be moved when moving the work tool.

The present invention addresses the foregoing and other drawbacks of prior art apparatuses for high-speed bi-directional movement of water jet nozzles and other work tools.

SUMMARY OF THE INVENTION

The present invention includes an apparatus for supporting and moving work tools to operate on work pieces supported by and traveling along an underlying conveyor. The apparatus includes a first carriage and a first support structure for supporting and guiding the first carriage for movement relative to the conveyor. The first carriage is driven by a drive system having a motive source located remotely from the first carriage and a drive train to interconnect the motive source with the first carriage. The apparatus also includes a second carriage guide structure mounted on the first carriage with a second carriage adapted to ride along a second support structure. The working tool is mounted to the second carriage. The drive system moves the second carriage along the second support structure utilizing a motive source located remotely from the first and second carriages and a drive train to interconnect the second motive source to the second carriage.

In a further aspect of the present invention, the two motive sources of the drive system are positioned at stationary locations within a sealed environment.

In accordance with additional aspects of the present invention, the motive sources of the drive system include servo motors that are interconnected to the carriages by drive belts.

In accordance with another aspect of the present invention, the second support structure is cantilevered from the first carriage in a direction substantially perpendicular to the first support structure. Accordingly the path of travel of the second carriage is substantially perpendicular to the path and travel of the first carriage.

As additional aspects of the present invention, the first support structure supports and guides the first carriage for movement generally transversely to the direction of movement of the conveyor. Alternatively, the first support structure may support and guide the first carriage for movement generally parallel to the direction of movement of the conveyor.

In accordance with a further aspect of the present invention, the working tool may consist of a high speed water cutting jet, a laser beam, a welding tool, a drilling tool, a glue dispenser, etc.

BRIEF DESCRIPTION OF THE DRAWINGS

The foregoing aspects in many of the attendant advantages of the present invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
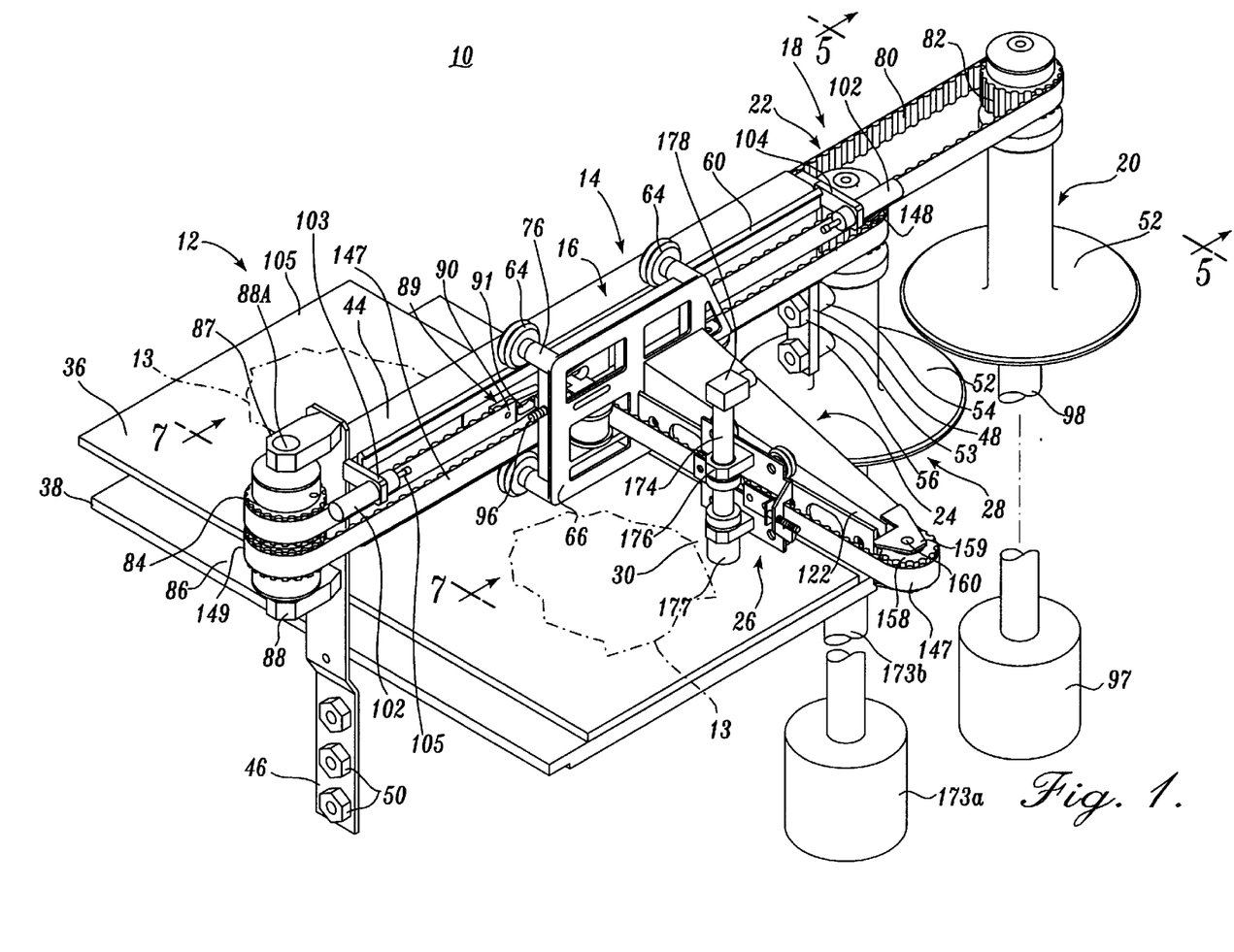
FIG. 1 provides a pictorial view of the present invention.
Figure 2:
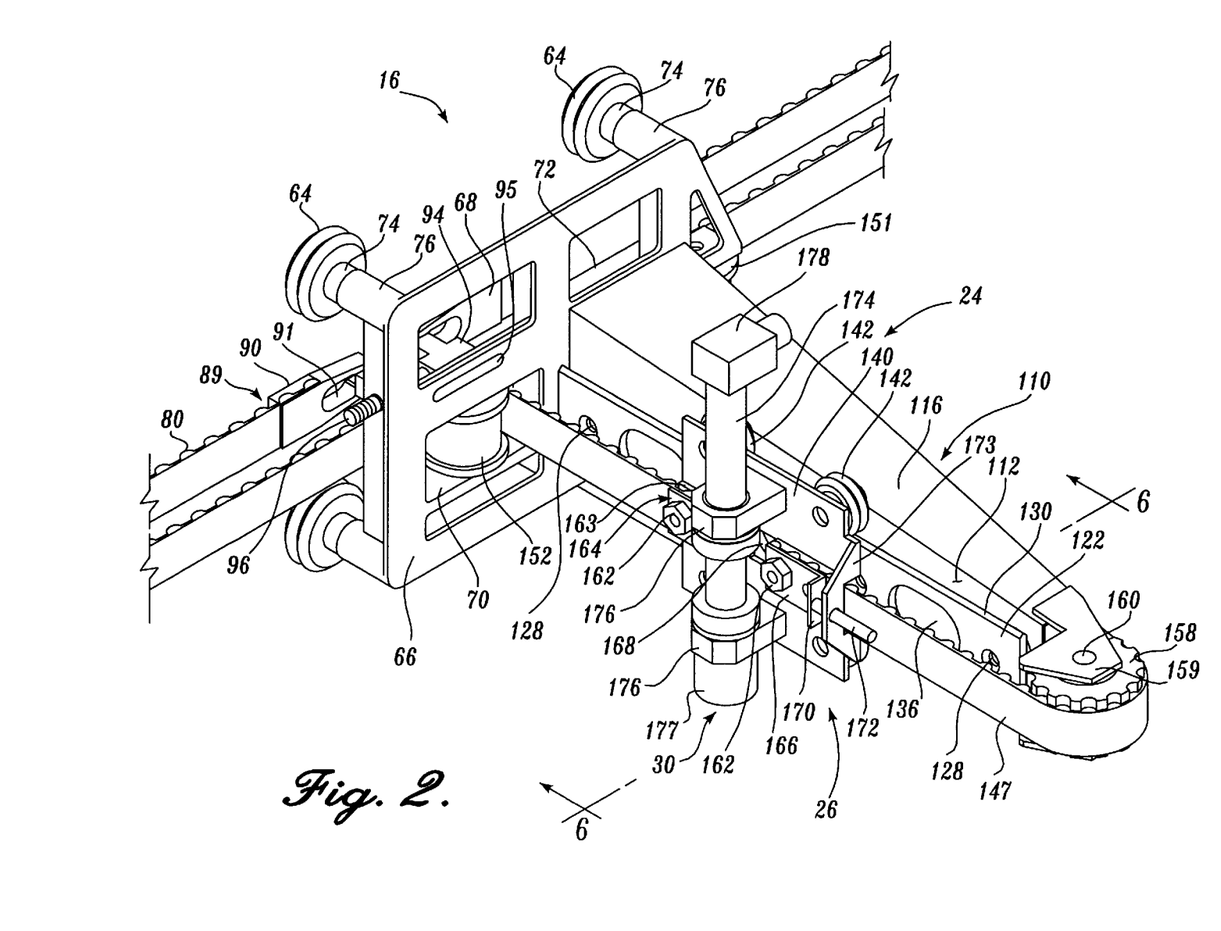
FIG. 2 is an enlarged pictorial view of a portion of FIG. 1.

Referring initially to FIGS. 1 and 2, the preferred embodiment of the apparatus 10 of the present invention is illustrated as mounted to a conveyor 12 for supporting and moving workpieces 13. The apparatus 10 in basic form includes a support structure 14 extending across the conveyor for supporting and guiding a carriage 16 for movement transversely to the direction of movement of the conveyor. The carriage 16 is powered by a drive system 18 including in part a motive system 20 and a drive train 22. A second, longitudinal support structure 24 is cantilevered outwardly from carriage 16 in a direction generally aligned with the direction of movement of conveyor 12. A second longitudinal carriage 26 is adapted to move along longitudinal support structure 24 by the drive system 18. In this regard, a second motive system 28 powers the longitudinal carriage 26 through the drive train 22. A work tool 30 is mounted on the longitudinal carriage 26 to move therewith as the work tool operates on the underlying workpiece being carried by the conveyor 12.

As will be appreciated in the following more detailed description, the apparatus 10 of the present invention is designed with a minimum of moving mass so that the work tool 30 can be moved as quickly as possible relative to the workpieces enabling the work tool can carry out precise operations on the workpieces at high speed. This is achieved at least in part by locating the motive systems 20 and 28 at stationary locations remote from the carriages 16 and 26. Also, a lightweight but highly durable drive system 18 is utilized to interconnect the carriages 16 and 26 to the motive systems 20 and 28.

Referring specifically to FIG. 1, the conveyor 12 includes a moving belt 36 that slides over a support bed 38. The bed 38 is supported by an underlying frame structure (not shown) in a standard manner. The conveyor belt 36 is driven at a selected speed by a drive motor (not shown) in a standard manner. The drive motor can be composed of a variable speed motor to thus adjust the speed of the belt 36. The workpieces 13 are carried on the conveyor belt 36 to be operated on by the work tool 30.

Next referring specifically to FIGS. 1 and 2, the transverse support structure 14 includes a beam structure 44 that spans transversely across the conveyor 12 at an elevation spaced above belt 36. Ideally the beam 44 is of hollow, rectangular construction, but may be formed in other manners and shapes without departing from the spirit or scope of the present invention. The ends of beam 44 are supported by upright brackets 46 and 48. As shown in FIG. 1, bracket 46 is fixed to the adjacent end of the beam 44 to extend downwardly for mounting to conveyor 12. A plurality of hardware members 50 extend through clearance holes (not shown) formed in the lower, offset portion of bracket 46 to attach the bracket to the conveyor. Bracket 48 extends downwardly from the opposite end of beam 44 for attachment to the outer housing portion 52 of motive system 28. In this regard, hardware members 53 extend through clearance holes provided in the lower end of bracket 48 to engage with bosses 54 and 56 extending transversely from housing 52. In this manner, the beam 44 is mounted securely stationary on the conveyor.

Support structure 14 also includes a track for guiding carriage 16 along beam 44, composed of an upper rail 60 and the lower rail 62 attached to the face of beam 44 facing the carriage. As illustrated in FIG. 2, the upper rail 60 extends along the upper corner of beam 44 whereas the lower rail 62 extends along the lower corner of the beam. As also illustrated, the upper surface of the upper track 60 and the lower surface of the lower track 62 are crowned to engage with the concave outer perimeters of the rollers 64 of carriage 16. As such, the carriage 16 is held captive on the track while traveling back and forth along beam 44.

Figure 3:
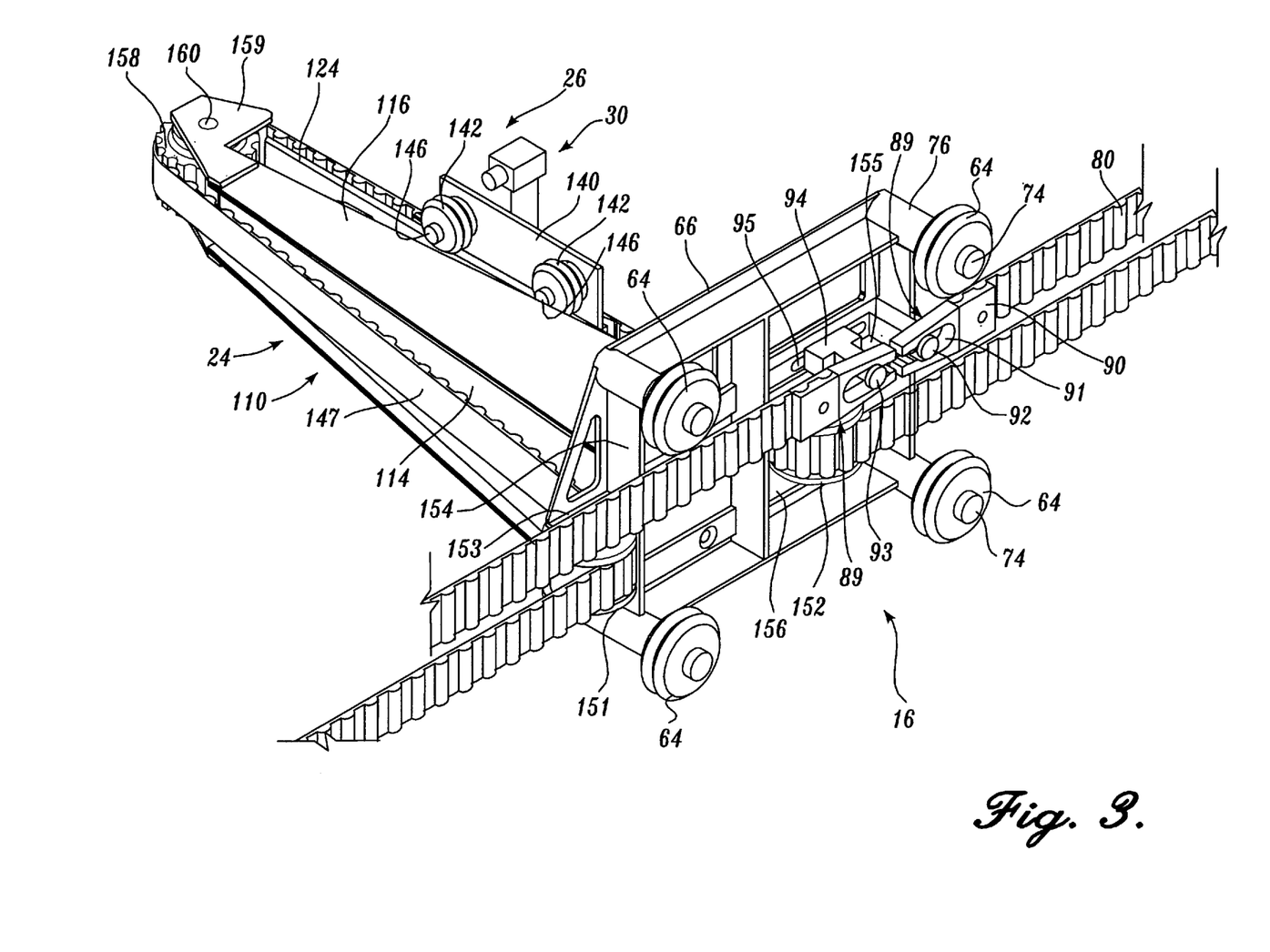
FIG. 3 is an enlarged pictorial view of a portion of FIG. 1, with certain parts removed to enhance clarity.
Figure 4:
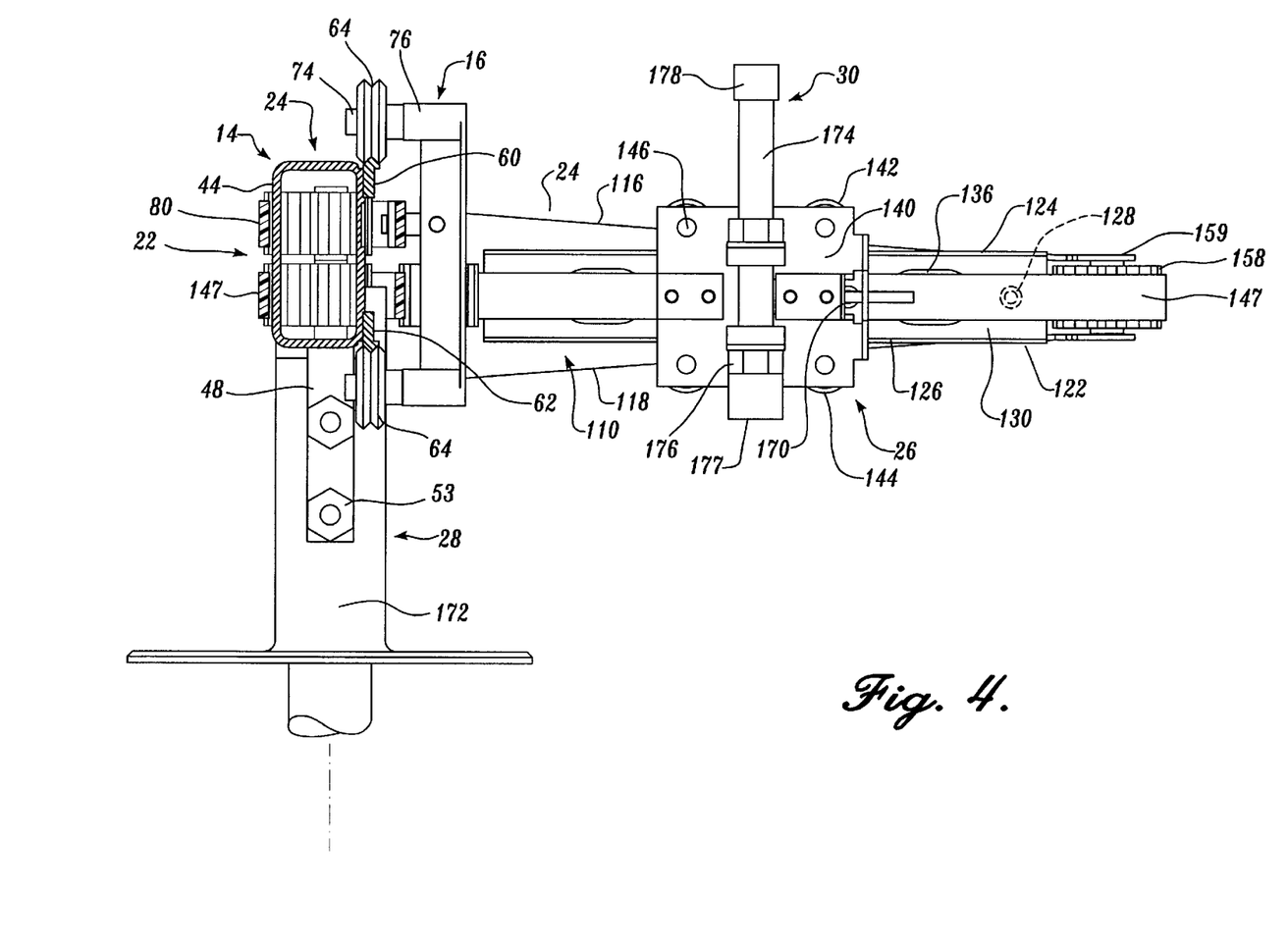
FIG. 4 is a pictorial view similar to FIG. 3, but taken from the back side of the transverse carriage shown therein.

As most clearly illustrated in FIGS. 3 and 4, carriage 16 includes a substantially planar, generally rectangularly shaped bed portion 66 having the reinforced outer perimeter for enhanced structure integrity. Openings 68, 70 and 72 are formed in bed 66 to reduce its weight while retaining the structural integrity of the bed. The carriage rollers 64 are attached to the corners of the bed 66 by stub axles 74 which engage within through bores formed in bosses 76 which extend transversely from each of the four corners of the carriage bed 66. Antifriction bearings, not shown, are utilized between the roller 64 and the stub axles 74 to enhance the free rolling of the carriage 16 along beam 44.

Carriage 16 is powered to move and back forth along beam 44 by drive system 18. In this regard, a timing belt 80 extends around a drive pulley 82 located at the upper end of motive system 20 and also around an idler pulley 84 of an idler assembly 86 mounted on the upper end of bracket 46 by upper and lower bracket ears 87 and 88. As such, the belt 80 makes a loop around the beam 44, extending closely along the sidewalls of the beam. The idler pulley 84 is adapted to rotate freely about central shaft 88a of the idler assembly 86 through the use of an antifriction bearing, not shown, with the upper and lower ends of the shaft being retained by bracket ears 87 and 88.

The ends of belt 80 are connected to the backside of carriage bed 66. As most clearly shown in FIGS. 1, 3 and 4, clips 89 are clamped to the ends of belt 80 for use in attaching the ends of the belt to the carriage 16 in a quick release manner. Each of the clips 89 includes a clamping face 90 for attachment to an end of the belt 80. The clips 89 also include an elongated slot portion 91 for engagement over pin 92 anchored to carriage 16 and anchor pin 93 extending transversely from a slide block 94 keyed within a longitudinal, horizontal slot 95 extending along a carriage bed 66. A threaded pin 96 extends outwardly of a slide block 94 in a direction substantially perpendicular to pin 93 to engage within a threaded hole formed in the perimeter of carriage bed 66 to extend outwardly of the carriage bed. The tension of belt 80 is adjusted by rotation of pin 96.

As shown in FIG. 4, the end of clip 89 is not closed, but rather the slot portion 91 is open, with the opening being of a width somewhat narrower than the diameter of anchor pin 92. It will be appreciated that if carriage 16 is ever is a "runaway" condition or if motive system 20 malfunctions tending to cause the carriage to overrun beam 44, the belt 80 can detach from the carriage 16 by separation of the end of clip 89 to cause the clip to longitudinally slide off of the anchor pin 92. As such, potential damage to apparatus 10 may be avoided or at least minimized.

Ideally, the motive system 20 includes a servo motor 97 programmable to control the movement of the carriage 16 back and forth along beam 44 a desired. The servo motor is located below housing 108 at a location substantially insulated from moisture or other contaminants that may be associated with the work being carried out on the workpieces. A drive shaft 98 extends up from the servo motor through housing 108 to power the drive pulley 82. The drive shaft is antifrictionally supported within housing 108 by a pair of bearings 99 and 100. The lower end of the drive shaft 98 is coupled to the output shaft of motor 97 by coupling collar 101. The drive pulley 82 is securely attached to the upper free end of drive shaft 98 by any convenient method, such by use of a key and key way, splines, shear pin etc. It will be appreciated that by the foregoing construction, the servo motor is located remotely from the carriage 16, with the driving force applied to the carriage 16 by the lightweight timing belt 80.

Although ideally motive system 20 utilizes a servo motor, other types of electrical, hydraulic or air motors may be employed without departing from the spirit or scope of the present invention. Such motors are standard articles of commerce.

By the foregoing construction, motive system 20 is capable of quickly accelerating and decelerating carriage 16 for movement along beam 44. To assist in the deceleration of the carriage 16, shock absorbers 102 are mounted at each end of beam 44 by brackets 103 and 104 extending outwardly from the beam. Ideally, but not essentially, the brackets 103 and 104 may be integrally constructed with brackets 46 and 48, respectively. The shock absorbers 102 include a plunger 105 directed at the end edges of carriage bed 66. Although not shown, a piston is attached to the plunger 105 within the interior of the shock absorber cylinder which is filled with a fluid to resist the retraction of the plunger 105 in a manner similar to a "standard" hydraulic shock absorber. Also, the shock absorber 102 includes an interior compression spring, not shown, that nominally extends the plunger 105 longitudinally outwardly from the shock absorber cylinder. As such, if the carriage bed 66 strikes against one of the plungers 105, the plunger retracts somewhat when bringing the carriage 16 to a stop.

Next referring specifically to FIGS. 1–4, the longitudinal support structure 24 cantilevers transversely from carriage 16 to be carried by the carriage. The support structure 24 includes a beam member 110 composed of a vertical sidewall 112 which is substantially perpendicular to the adjacent face of carriage bed 66. The opposite sidewall 114, rather than being substantially perpendicular to the carriage bed 66 tapers towards sidewall 112 in the direction away from the carriage bed. Likewise, the top and bottom walls 116 and 118 of beam 110 taper towards the free end of the beam 110 thereby to cooperatively form a generally peaked or pyramid-shape. As will be appreciated, this enhances the structural integrity of the beam while reducing its weight relative to a parallel piped structure.

Figures 5, 6:
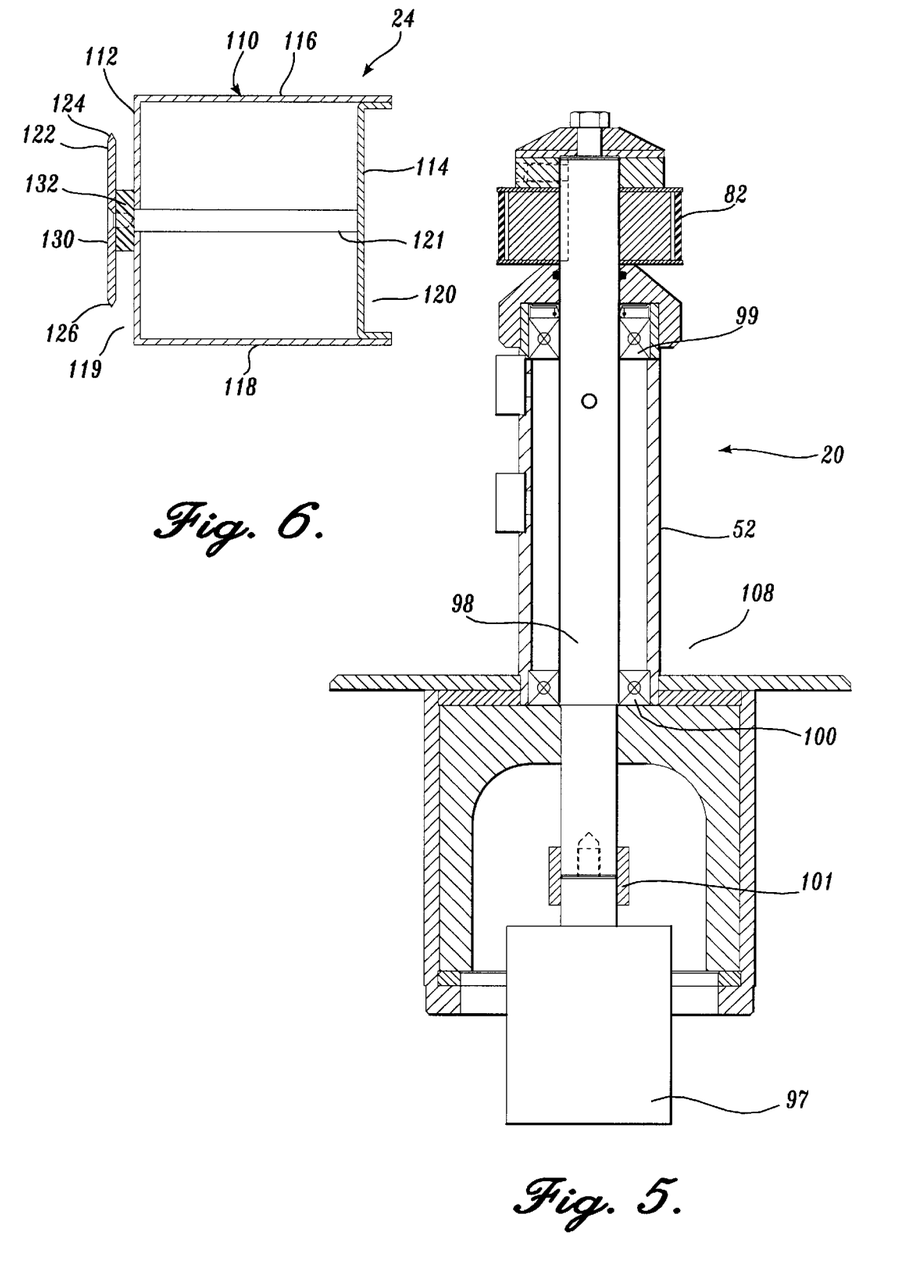
FIG. 5 is a cross-sectional view of a portion of FIG. 1 taken substantially along lines 5—5 thereof.
FIG. 6 is a cross-sectional view of FIG. 2 taken along lines 6—6 thereof.

As illustrated in FIG. 5, ideally the beam 110 is of hollow construction, composed of two channel-shaped members 119 and 120. Channel member 120 nests within channel member 119 so that the flanges of channel member 120 overlap the free end edges of the flanges of channel 119, as shown in FIG. 5. A plurality of spacers 121 are disposed within the beam member 110 and located along its length to bear against the web walls 112 and 114 of the channel members 119 and 120. The flanges of the two channel members are attached together and the spacers 121 are attached to the channel members by any convenient means, including by weldments. It will be appreciated that by the foregoing construction, beam 110 is not only lightweight, but also of sufficient structural integrity to carry significant weights without deflection. Lastly, beam 110 may be secured to the carriage bed 66 by any appropriate technique, including by hardware fasteners, weldments, etc.

Support structure 24 includes an elongate track 122 extending longitudinally along and mounted on beam sidewall 112. Track 122 includes formed upper and lower edge portions 124 and 126 that are spaced away from sidewall 112 to define upper and lower rails for guiding the longitudinal carriage 26. As most clearly illustrated in FIGS. 2 and 3, the track 122 is attached to beam sidewall 112 by a plurality of hardware members 128 and extend through clearance holes formed in the track web portion 130 and through spacers 132 fixedly mounted to sidewall 112 at the back side of the track to engage the beam 110. Also to minimize the weight of track 122, cut-out openings 136 are formed in the track web portion.

The longitudinal carriage 26 is adapted to travel along track 122. In this regard, the carriage 26 includes a substantially planar, rectangularly shaped bed portion 140 and a pair of upper rollers 142 and a pair of lower rollers 144 having concave outer perimeter portions sized to closely engage with the correspondingly crowned track upper and lower rails 124 and 126. The rollers 142 and 144 are mounted on stub shafts extending transversely from the carriage bed 140. Ideally, but not shown, anti-friction bearings are utilized between the stub shafts 146 and the rollers 142 and 144 to enhance the free movement of the carriage 26 along track 122.

Carriage 26 is moved back and forth along track 122 by drive system 18. In this regard, the drive system includes the second motive system 28, constructed similarly to motive system 20, to power a timing belt 147. As perhaps most clearly shown in FIG. 1, the timing belt 147 is trained around a drive pulley 148 mounted on the upper end of motive system 28 and also trained around an idler pulley 149 located below idler pulley 84 on the idler assembly 86 which is secured to the end of beam 44 opposite the motive system 28. As such, the belt 147 also extends along the opposite sidewalls of beam 44, but at an elevation spaced below belt 80.

The belt 147 also trains around idler pulleys 151 and 152 mounted on transverse carriage 16. As illustrated in FIG. 4, the idler pulley 151 is mounted to an upper bracket plate 153 and a lower similar bracket plate, not shown, extending transversely outwardly from the end perimeter wall 154 of the carriage. A vertical shaft extends between these to bracket plates and through the longitudinal center of the roller pulley 151. Idler pulley 152 is mounted between a pair of parallel, spaced apart frame plates 155 and 156. As with idler pulley 151, idler pulley 152 rotates about a vertical shaft extending between the two frame plates. The idler pulleys 151 and 152 redirect the belt 147 to extend along the sides of transverse beam 110. Antifriction bearings, not shown, are employed to enable the idler pulleys 151 and 152 to freely rotate about their respective vertical shafts.

A further idler pulley 158 is mounted on the free end of beam 44 by a formed bracket 159 which is fixedly attached to the beam 110. An axle shaft 160 extends through the center of an antifriction bearing mounted within pulley 158, with the ends of the shaft retained by the upper and lower ears of bracket 159.

The ends of belt 147 are attached to the bed 140 of carriage 26. To this end, one end of belt 147 is clamped to the carriage bed by hardware members 162 that extend through close fitting clearance holes formed in a clamping plate 163 to clamp the end of the pulley to an underlying clamping plate 164 mounted on the outer face of carriage bed 140. The opposite end of belt 147 is clamped to a slide bar 166 which is sized to slide within a horizontal slot 168 formed in the carriage bed 140. A tab 170 extends generally transversely from the end of slide bar 166, and a threaded lock pin 172 in turn extends transversely from the tab to engage within a threaded hole formed in a flange 173 extending transversely from the adjacent end of carriage bed 140. The tension of belt 147 is adjusted by rotation of lock pin 172.

Rotation of drive pulley 148 results in movement of the belt 147 which in turn causes the transverse carriage 26 to move along track 122. As with motive system 20, ideally motive system 28 includes a servo motor 173a which is drivingly connected with drive pulley 152 by a drive shaft 173b that extends upwardly through housing 52 of the motive system. However, as with motive system 20, other types of well known and commercially available rotational actuators may be utilized in placed of a servo motor. Also as with motive system 20, it will be appreciated that motive system 28 is located remotely from not only transverse carriage 16, but also longitudinal carriage 26. As a result, the mass of the motive system 20 is not carried by either of the two carriages, rather the motive system is positioned at a stationary location, with the drive force being transferred from motive system 28 to carriage 26 by a lightweight timing belt 147. As a consequence, the total mass of the moving portions of apparatus 10 (carriage 16, support structure 24 and carriage 26) is kept to a minimum. This allows extremely high speed movement of the two carriages, with accelerations exceeding eight gravities.

A work tool 30 in the form of high pressure liquid nozzle assembly is mounted on the longitudinal carriage 26 to move therewith. The nozzle assembly includes a body portion 174 that is secured to the carriage bed 140 by a pair of vertically spaced apart brackets 176. The nozzle assembly 30 includes a lower outlet tip 177 directed downwardly toward conveyor belt 36. An entrance elbow 178 is attached to the upper end of nozzle body 174. High pressure liquid nozzles of the type of nozzle 30 are well known articles of commerce.

Figure 7:
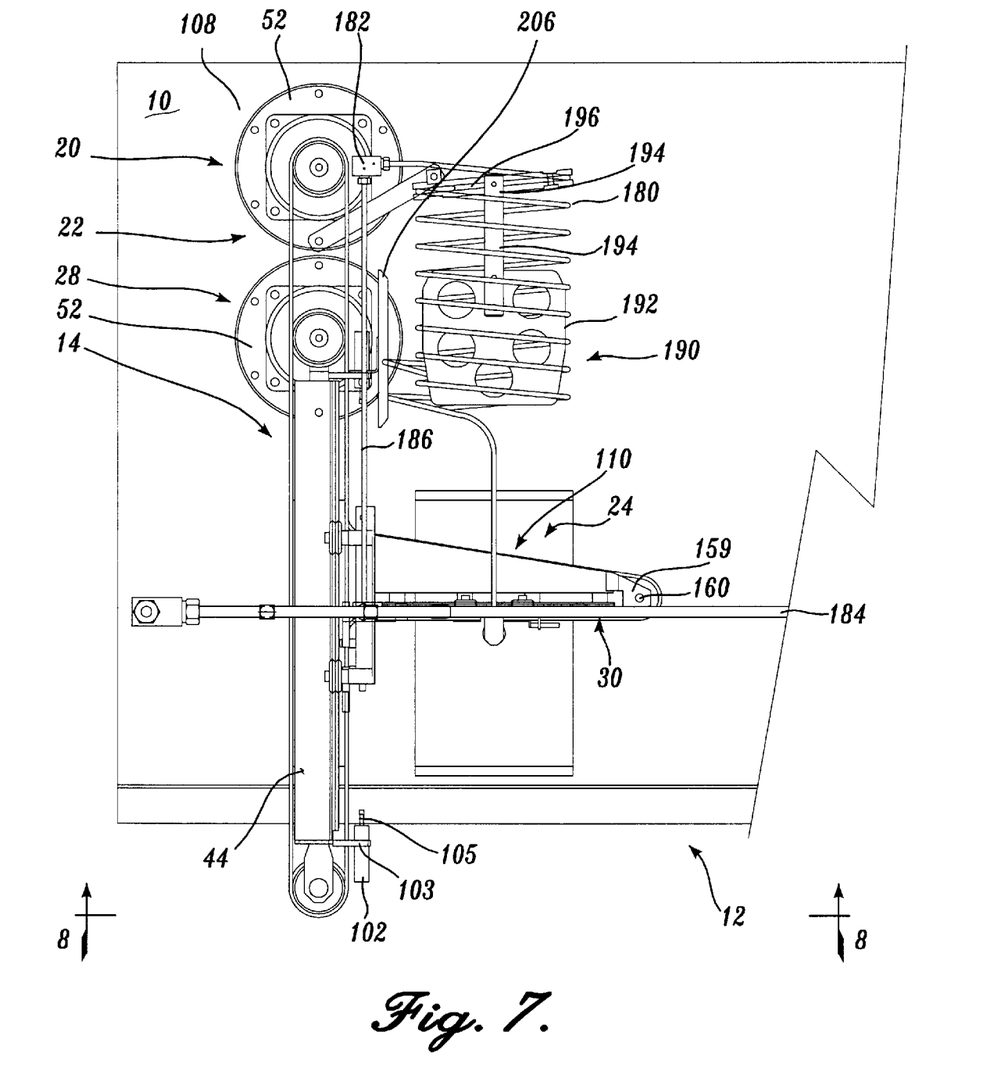
FIG. 7 is a plan view of FIG. 1.
Figure 8:
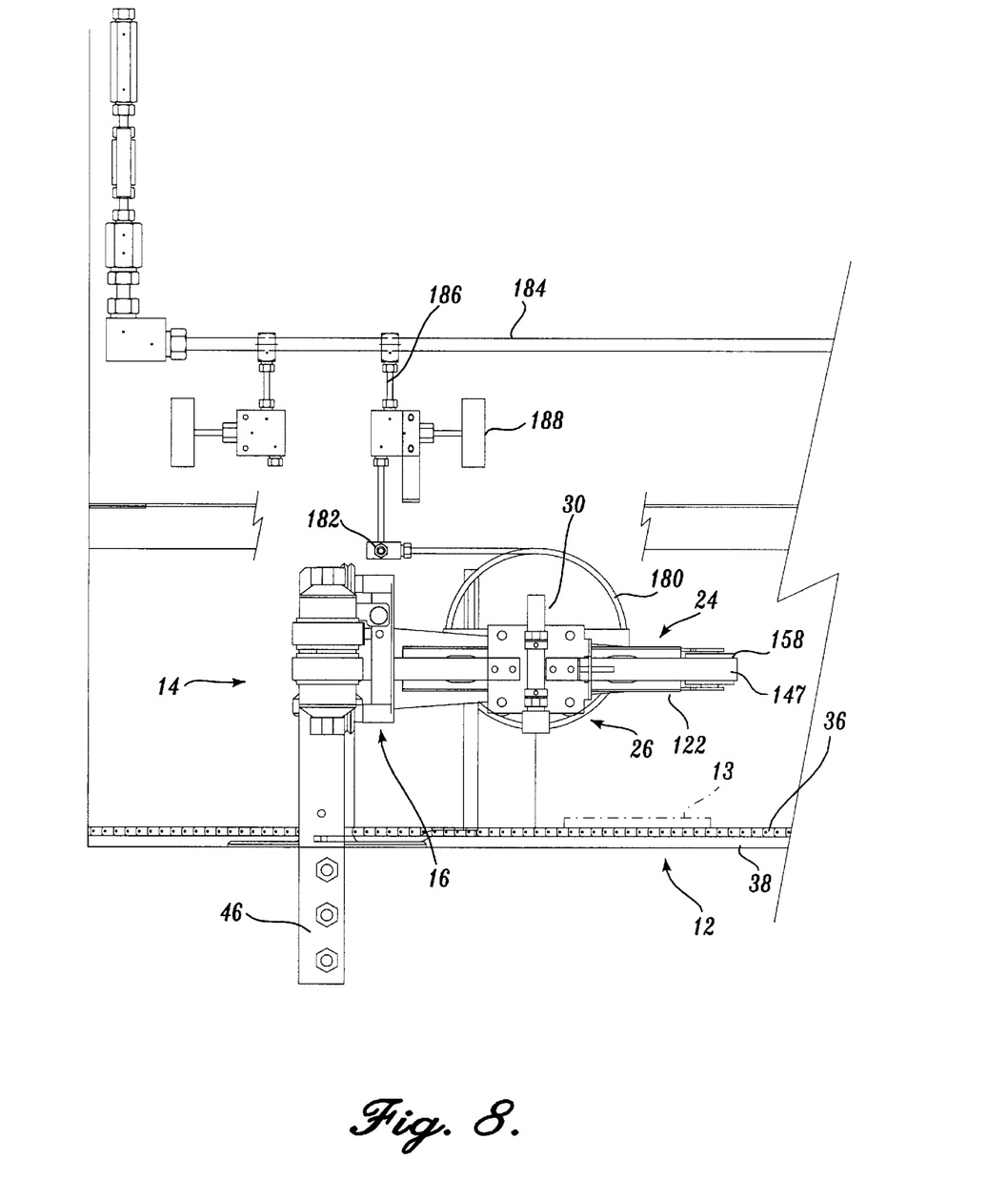
FIG. 8 is a side elevational view of FIG. 7 taken along lines 8—8 thereof.
Figure 9:
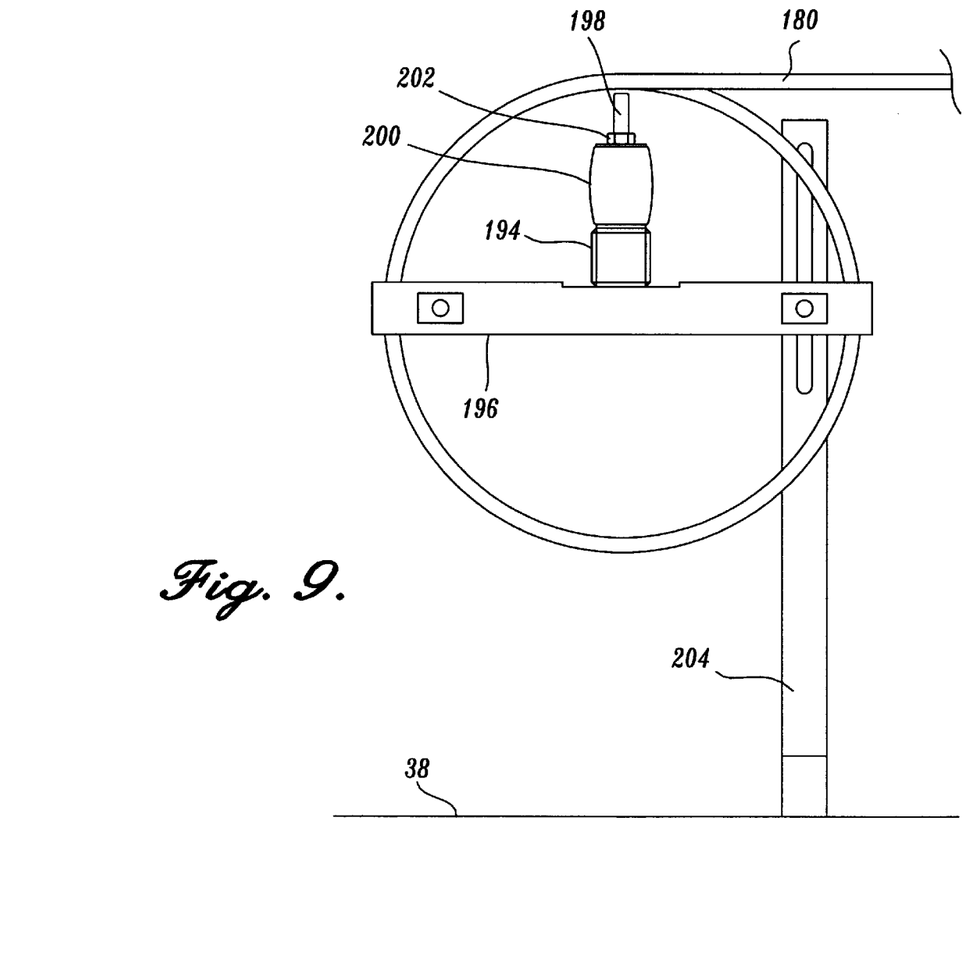
FIG. 9 is an enlarged, partial plan view taken from the opposite side of FIG. 1 relative to FIG. 8.

Referring specifically to FIGS. 7–9, high pressure water is supplied to nozzle assembly 30 by a supply line 180 having an entrance end connected to an elbow 182 and an exit end connected to the inlet elbow 178. As shown most clearly in FIG. 7, the supply line 180 is coiled along a substantial portion of its length in a shape generally corresponding to a compression spring. The central axis of these coils is substantially horizontal and parallel to beam 44. High pressure water is supplied to elbow 182 from a manifold line 184 by a trunk line 186. A shutoff valve 188 is interposed in the trunk line 186.

It will be appreciated that by the foregoing construction of the coiled water supply line 180, high pressure water is supplied to a nozzle assembly 30 without impeding the movement of carriages 16 and 26. As illustrated in FIG. 7, the end of the coiled supply line 180 adjacent the nozzle assembly 30 is capable of moving transversely to beam 44 with the movement of carriage 26 as well as longitudinally relative to the beam 44 with the movement of carriage 16. Ideally a damper 190 is utilized to dampen excessive oscillations or movements of the coiled supply line 180, which could occur during high speed movement of the carriages.

The damper 190 includes a generally rectangularly shaped plate portion 192 disposed substantially horizontally within the center of the coils of line 180 to closely fit therein. The plate portion 192 is supported by a handle member 194 extending from the plate portion along the longitudinal center line of the coils of line 180. The end of handle 194 is attached to a transverse spanner bar 196 by a threaded rod 198 extending upwardly from the spanner bar through a clearance hole formed in the handle 194 and then through a compressible donut member 200. A threaded nut 202 engages with the upper end of rod 198 to secure the handle 194 to the spanner bar 196. The nut 202 may be adjusted to adjust the extent to which the dampener 190 is allowed to rotate relative to spanner bar 196 about rod 198. The spanner bar 196 has slots formed in its end portions to receive the coiled line 180. As most clearly shown in FIG. 9, one end of the spanner bar 196 is mounted to an upright post 204 to securely support the spanner bar. As carriage 26 moves back and forth, excessive oscillation of the coils of supply line 180 is thereby dampened by the dampener 190. Also, a shield 206, as shown in FIG. 7, may be mounted on housing 52 of motive system 28 to prevent the coiled line 180 from striking against components of the present invention located thereat.

In the operation of apparatus 10, as workpieces 13 are carried along conveyor 12, the work tool 30 is moved along selected paths of travel by carriages 16 and 26 powered by drive system 18. Carriage 16 moves the tool transversely, and carriage 26 moves the work tool longitudinally relative to the direction of travel of the conveyor 12. This enables the work tool to travel very quickly along complicated routes which are programmed into the operation of the servo motors of the motive systems 20 and 28. Further, the operation of the two motive systems is coordinated so that the transverse movement of carriage 16 is automatically compensated for when controlling the position of longitudinal carriage 26. As transverse carriage 16 moves along beam 44, longitudinal carriage 26 would automatically tend to correspondingly move along beam 110 due to the "endless" nature of belt 147 (i.e., the ends of the belt 147 are attached to carriage 26 to form an endless loop within the carriage). However, as motive system 20 is actuated to apply power to belt 80, motive system 28 is correspondingly actuated to apply power to belt 147 comparably thereby to compensate for the movement of belt 80.

Moreover, it will be appreciated that by constructing carriages 16 and 26 and longitudinal support structure 24 in a lightweight but structurally sound manner, the moving mass of these components were kept to a minimum thereby minimizing the torque needed from the motive systems 20 and 28 to accelerate and decelerate the carriages 16 and 26. Further, by locating the motive systems 20 and 28 remote from the carriages in stationary positions, the masses of the motive systems were not carried by the moving carriages. As a consequence of the foregoing, the work tool 30 can be accelerated and decelerated quickly and also the direction of movement of the work tool reversed more quickly than if the moving components of apparatus 10 were constituted greater mass than in the present invention.

Although a preferred embodiment of the present invention has been described and illustrated, it will be appreciated that the scope of the present invention is not limited by the foregoing description, but rather is defined by the following claims. Moreover, many alternatives to the foregoing structural components may be employed. For example, rather than positioning support structure 14 of the first carriage 16 transversely to the direction of movement of conveyor 12, the support structure may be aligned generally parallel to the direction of movement of the conveyor, for instance, along one side of the conveyor. As a consequence, the second carriage 26 would be supported by the longitudinal support structure to travel generally transversely to the direction of movement of the conveyor. By this construction, it is possible to provide a relatively long travel path for the first carriage, with the travel path of the second carriage generally corresponding to the distance across the width of the conveyor.

In further alternatives to the above described structure, the work tool 30 can comprise other types of tools rather than a high pressure water jet nozzle, for instance, the work tool can be composed of a laser beam, a glue dispenser, a welding head, etc. Further, as noted above, motive systems 20 and 28 can utilize rotational actuators other than electrical servo motors, for instance, hydraulic or air motors, torque motors, etc. Further, the timing belts 80 and 50 can be replaced by other types of power transmission devices, for instance, V-belts, flat belts, metal belts or other types of belts, various types of chains as well as various types of cables.

The embodiments of the invention in which an exclusive property or privilege is claimed are defined as follows:

1. An apparatus for supporting and moving a working apparatus, comprising;

(a) a first carriage;

(b) a first carriage support structure for supporting and guiding the first carriage for movement along the first support structure;

(c) a drive system for moving die first carriage along the first support structure;

(d) a second carriage support structure supported and carried by the first carriage;

(e) a second carriage adapted to ride along the second carriage support structure, the working apparatus carried by the second carriage; and (f) wherein the drive system also moves the second carriage along the second support structure, the drive system comprising:

(1) a motive system for the first and second carriages, the motive system positioned at a location remote from both the first and second; carriages and from both the first and, second support structures; and (2) a drive train interconnecting the second carriage with the remotely located motive system of the drive system said drive train comprising a line element to transmit motive force from the remotely located motive system to the second carriage to move the second carriage along the second support structure.

2. The apparatus of claim 1, wherein the motive system of the drive system is positioned at a stationary location relative to the first and second carriages and relative to the first and second support structures.

3. The apparatus of claim 2, wherein the drive train of the drive system comprises a drive belt extending between the second carriage and the motive system of the drive system.

4. The apparatus of claim 3, wherein the motive system of the drive system comprises a servo motor.

5. The apparatus of claim 1, wherein the line element of the drive train includes a drive belt extending between the second carriage and the motive system of the drive system.

6. The apparatus of claim 5, wherein the motive system of the drive system comprises a servo motor.

7. The apparatus of claim 1, further comprising a conveyor for carrying workpieces past the working apparatus, the conveyor located in proximity to the path of travel of the first carriage.

8. The apparatus of claim 7, wherein the conveyor is positioned beneath the first carriage.

9. The apparatus of claim 7, wherein the first support structure is stationary relative to the conveyor.

10. An apparatus for carrying out work on a workpiece by operation of a work tool, comprising:

(a) a conveyor for advancing the workpiece;

(b) a first carriage;

(c) a first support structure for supporting and guiding the first carriage for directional movement of the first carriage relative to the conveyor;

(d) a second carriage for carrying the working tool;

(e) a second support structure mounted on the first carriage to support and guide the second carriage for movement in the direction generally perpendicularly to the direction of movement of the first carriage; and (f) a drive system for moving the first carriage along the first support structure and for moving the second carriage along the second support structure, the drive system comprising:

(1) a motive system disposed at a location remote from both the first and second carriages and also remote from both the first and second support structures; and (2) a drive train system comprising line means interconnecting the motive system with the first carriage and interconnecting the motive system with the second carriage.

11. The apparatus according to claim 10, wherein the line means comprises a belt extending between the remotedly located motive system and the second carriage.

12. The apparatus according to claim 11, wherein the belt comprises an endless belt.

13. The apparatus according to claim 12, wherein the motive system comprises a motor capable of generating torque.

14. The apparatus according to claim 13, wherein the motor comprises a servo motor.

15. The apparatus according to claim 10, wherein the motive system comprises a torque-generating motor disposed at a location stationary relative to the first support structure.

16. The apparatus according to claim 15, wherein the drive train comprises an endless line means for interconnecting the motor with the second carriage.

17. The apparatus according to claim 16, wherein the endless line means is selected from a group consisting of a V belt, a flat belt, a cog belt, a timing belt, a metal belt, a chain and a cable.

18. An apparatus for cutting a moving workpiece, comprising:

(a) a conveyor for advancing the workpiece;

(b) a first carriage;

(c) a first track structure located adjacent the conveyor, the first track structure adapted to support and guide the first carriage for directional travel relative to the first conveyor;

(d) a second carriage;

(e) a cutter mountable on the second carriage;

(f) a second track structure mounted on the first carriage to support and guide the second carriage for movement in a direction generally transversely to the direction of travel of the first carriage; and (g) a drive system for moving the first carriage along the first track structure and for moving the second carriage along the second track structure, the drive system comprising:

at least one torque-generating motor disposed at a location remote from both the first and second carriages and remote from both the first and second track structures; and a drive belt system to interconnect the at least one motor with the first carriage and to interconnect the at least one motor with the second carriage.

19. The apparatus according to claim 18, wherein the drive belt system comprises at least one endless belt extending between the at least one motor and the second carriage.

20. The apparatus according to claim 18, wherein the at least one motor comprises a servo motor.

21. The apparatus according to claim 18, wherein the at least one motor is disposed at a location stationary relative to the first track system.

22. The apparatus according to claim 1, wherein:

the first carriage support structure extending longitudinally;

the second carriage support structure extending longitudinally; and the line element, which transmits motive force from the remotely located motive system to the second carriage, extends lengthwise along the first carriage support structure as well as lengthwise along the second carriage support structure.

23. The apparatus according to claim 10, wherein the line means interconnecting the motive system with the second carriage extends along the first support structure and also extends along the second support structure.

24. The apparatus according to claim 19, wherein the endless belt extends along the first track system and also extends along the second track system to interconnect the at least one motor with the second carriage.

* * * * *

UNITED STATES PATENT AND TRADEMARK OFFICE
CERTIFICATE OF CORRECTION

Page 1 of 2

| | |
|---|---|
| PATENT NO. : | 5,868,056 |
| DATED : | February 9, 1999 |
| INVENTOR(S) : | C.E. Pfarr et al. |

It is certified that error appears in the above-indentified patent and that said Letters Patent is hereby corrected as shown below:

| COLUMN | LINE | |
|---|---|---|
| [56] Pg. 1, col. 1 | Refs. Cited (U.S. Pats., item 13) | "Naus" should read --Nasu-- |
| 2 | 41 | "in many" should read --and many-- |
| 3 | 21 | "can" should read --to-- |
| 4 | 7 | "comers" should read --corners-- |
| 4 | 9 | "comers" should read --corners-- |
| 4 | 13 | "and back forth" should read --back and forth-- |
| 4 | 43 | "is ever is" should read --is ever in-- |
| 4 | 52 | "a desired." should read --as desired.-- |
| 4 | 63 | "such by" should read --such as by-- |
| 4 | 63 | After "shear pin" insert --,-- |
| 6 | 30 | "these to" should read --these two-- |
| 7 | 3 | "in placed of" should read --in place of-- |

UNITED STATES PATENT AND TRADEMARK OFFICE
CERTIFICATE OF CORRECTION

PATENT NO. : 5,868,056
DATED : February 9, 1999
INVENTOR(S) : C.E. Pfarr et al.

It is certified that error appears in the above-indentified patent and that said Letters Patent is hereby corrected as shown below:

| COLUMN | LINE | |
|---|---|---|
| 9 (Claim 1, | 4 line 2) | After "comprising" delete ";" and insert therefor --:-- |
| 9 (Claim 1, | 10 line 7) | "die" should read --the-- |
| 9 (Claim 1, | 24 line 19) | After "second" delete ";" |
| 9 (Claim 1, | 25 line 20) | After "and" delete "," |
| 10 (Claim 11, | 13 line 2) | "remotedly" should read --remotely-- |

Signed and Sealed this

Tenth Day of August, 1999

Q. TODD DICKINSON

*Attest:*

*Attesting Officer*   Acting Commissioner of Patents and Trademarks